(12) United States Patent
Nair et al.

(10) Patent No.: US 11,703,849 B2
(45) Date of Patent: Jul. 18, 2023

(54) PREDICTING END OF LIFE FOR INDUSTRIAL AUTOMATION COMPONENTS

(71) Applicant: Rockwell Automation Technologies, Inc., Mayfield Heights, OH (US)

(72) Inventors: Suresh R. Nair, Nashua, NH (US); Lee A. Lane, Medford, MA (US); Brian J. Taylor, Boston, MA (US); Yongyao Cai, Malden, MA (US); Burt Sacherski, Nashua, NH (US); Ashley M. Killian, Eastlake, OH (US); Kevin Zomchek, Nashua, NH (US); Michelle L. Poublon, Nashua, NH (US); Linxi Gao, Reading, MA (US); Timothy P. Wolfe, Medford, MA (US); Rebecca R. Jaeger, Somerville, MA (US); Wayne R. Foster, Tyngsborough, MA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 181 days.

(21) Appl. No.: 17/142,092

(22) Filed: Jan. 5, 2021

(65) Prior Publication Data

US 2022/0214680 A1 Jul. 7, 2022

(51) Int. Cl.
*G05B 23/02* (2006.01)
*G06N 20/00* (2019.01)

(52) U.S. Cl.
CPC ..... *G05B 23/0283* (2013.01); *G05B 23/0281* (2013.01); *G05B 23/0291* (2013.01); *G06N 20/00* (2019.01)

(58) Field of Classification Search
CPC ............ G05B 23/0283; G05B 23/0281; G05B 23/0291; G06N 20/00
See application file for complete search history.

(56) References Cited

U.S. PATENT DOCUMENTS

2003/0114965 A1* 6/2003 Fiechter ............... G05B 23/024
714/E11.158

FOREIGN PATENT DOCUMENTS

| CN | 110533325 A | 12/2019 |
| DE | 10235525 A1 | 4/2003 |
| EP | 2951653 B1 | 11/2019 |
| KR | 102073810 B1 | 3/2020 |

OTHER PUBLICATIONS

EPO, European Application No. 21216386.9, Extended European Search Report, dated May 31, 2022, pp. 1-8.

* cited by examiner

*Primary Examiner* — Manuel A Rivera Vargas (57) ABSTRACT

A method for predicting end-of-life for a component includes determining a baseline lifetime model for a component connected to a machine functional safety system. The component is part of a system with physical devices. The method includes monitoring environmental conditions and usage conditions of the component and modifying the baseline lifetime model based on the monitored environmental and usage conditions to produce a modified lifetime model for the component. The method includes tracking a lifetime progress of the component with respect to the modified lifetime model and sending an alert in response to lifetime progress of the component reaching a lifetime threshold associated with the modified lifetime model.

20 Claims, 6 Drawing Sheets

PREDICTING END OF LIFE FOR INDUSTRIAL AUTOMATION COMPONENTS

BACKGROUND INFORMATION

The subject matter disclosed herein relates to end-of-life predictions for components and more specifically relates to end-of-life predictions by using environmental and usage data to modify a baseline lifetime model of a component of a system with physical devices.

BRIEF DESCRIPTION

A method for predicting end-of-life for a component is disclosed. An apparatus and computer program product the functions of the method. The method includes determining a baseline lifetime model for a component connected to a machine functional safety system. The component is part of a system with physical devices. The method includes monitoring environmental conditions and usage conditions of the component and modifying the baseline lifetime model based on the monitored environmental and usage conditions to produce a modified lifetime model for the component. The method includes tracking a lifetime progress of the component with respect to the modified lifetime model and sending an alert in response to lifetime progress of the component reaching a lifetime threshold associated with the modified lifetime model.

An apparatus for predicting end-of-life for a component includes a processor and a memory that stores program code executable by the processor to determine a baseline lifetime model for a component connected to a machine functional safety system, where the component is part of a system with physical devices, and monitor environmental conditions and usage conditions of the component. The program code is executable by the processor to modify the baseline lifetime model based on the monitored environmental and usage conditions to produce a modified lifetime model for the component, to track a lifetime progress of the component with respect to the modified lifetime model, and to send an alert in response to lifetime progress of the component reaching a lifetime threshold associated with the modified lifetime model.

A computer program product for predicting end-of-life for a component includes a computer readable storage medium having program code embodied therein. The program code is executable by a processor to determine a baseline lifetime model for a component connected to a machine functional safety system, where the component is part of a system with physical devices, to monitor environmental conditions and usage conditions of the component, and to modify the baseline lifetime model based on the monitored environmental and usage conditions to produce a modified lifetime model for the component. The program code is executable by a processor to track a lifetime progress of the component with respect to the modified lifetime model and to send an alert in response to lifetime progress of the component reaching a lifetime threshold associated with the modified lifetime model.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "system" or the like. Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory ("RAM"), a read-only memory ("ROM"), an erasable programmable read-only memory ("EPROM" or Flash memory), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. As used herein, a computer readable storage medium is a non-transitory computer readable storage medium. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems, machine functional safety systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features. In another embodiment, the computer program product is at least partially deployed on a machine functional safety system.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

The description of elements in each figure may refer to elements of proceeding figures. Like numbers refer to like elements in all figures, including alternate embodiments of like elements.

A method for predicting end-of-life for a component is disclosed. An apparatus and computer program product the functions of the method. The method includes determining a baseline lifetime model for a component connected to a machine functional safety system. The component is part of a system with physical devices. The method includes monitoring environmental conditions and usage conditions of the component and modifying the baseline lifetime model based on the monitored environmental and usage conditions to produce a modified lifetime model for the component. The method includes tracking a lifetime progress of the component with respect to the modified lifetime model and sending an alert in response to lifetime progress of the component reaching a lifetime threshold associated with the modified lifetime model.

In some embodiments, the method includes using machine learning to contribute to derivation of the baseline lifetime model that is modifiable and applicable to the component of the system with physical devices. In further embodiments, the machine learning includes tracking a lifetime progress of a plurality of components similar to the component of the system with physical devices and tracking usage conditions, environmental conditions, and failures of the plurality of components to derive modifications applicable to the baseline lifetime model based on the usage conditions and applicable environmental conditions of the component of the system with physical devices.

In some embodiments, the method includes contributing to derivation of the baseline lifetime model that is modifiable and applicable to the component of the system with physical devices by testing a plurality of components similar to the component of the system with physical devices under various usage and environmental conditions and tracking failures of the plurality of components. In other embodiments, the method includes contributing to derivation of the baseline lifetime model that is modifiable and applicable to the component of the system with physical devices by gathering information from customers reporting component failures of components similar to the component of the system with physical devices and gathering usage information and environmental information where the components were installed.

In some embodiments, the component of the system with physical devices is a safety device connected to the machine functional safety system. In other embodiments, the usage conditions include operating cycles, current, voltage and/or power usage of the component. In other embodiments, the environmental conditions include vibration, temperature, humidity and/or chemicals present where the component is installed. In other embodiments, the lifetime threshold includes a point in the modified lifetime model indicative of the component approaching a rapid increase in probability of failure of the component. In other embodiments, the component includes an interlock switch, a non-contact switch, a limit switch, a light curtain, a cable pull switch and/or a mechanical switch.

An apparatus for predicting end-of-life for a component includes a processor and a memory that stores program code executable by the processor to determine a baseline lifetime model for a component connected to a machine functional safety system, where the component is part of a system with physical devices, and monitor environmental conditions and usage conditions of the component. The program code is executable by the processor to modify the baseline lifetime model based on the monitored environmental and usage conditions to produce a modified lifetime model for the component, to track a lifetime progress of the component with respect to the modified lifetime model, and to send an alert in response to lifetime progress of the component reaching a lifetime threshold associated with the modified lifetime model.

In some embodiments, the apparatus includes program code executable by the processor to use machine learning to contribute to derivation of the baseline lifetime model that is modifiable and applicable to the component of the system with physical devices. In further embodiments, the machine learning includes tracking a lifetime progress of a plurality of components similar to the component of the system with physical devices and tracking usage conditions, environmental conditions, and failures of the plurality of components to derive modifications applicable to the baseline lifetime model based on the usage conditions and applicable environmental conditions of the component of the system with physical devices.

In some embodiments, the apparatus includes program code executable by the processor to contribute to derivation of the baseline lifetime model that is modifiable and applicable to the component of the system with physical devices by testing a plurality of components similar to the component of the system with physical devices under various usage and environmental conditions and tracking failures of the plurality of components. In other embodiments, the apparatus includes program code executable by the processor to contribute to derivation of the baseline lifetime model that is modifiable and applicable to the component of the system with physical devices by gathering information from customers reporting component failures of components similar to the component of the system with physical devices and gathering usage information and environmental information where the components were installed.

In some embodiments, the usage conditions include operating cycles, current, voltage and/or power usage of the component. In other embodiments, the environmental conditions include vibration, temperature, humidity and/or chemicals present where the component is installed. In other embodiments, the lifetime threshold includes a point in the modified lifetime model indicative of the component approaching a rapid increase in probability of failure of the component. In other embodiments, the component includes an interlock switch, a non-contact switch, a limit switch, a light curtain, a cable pull switch and/or a mechanical switch.

A computer program product for predicting end-of-life for a component includes a computer readable storage medium having program code embodied therein. The program code is executable by a processor to determine a baseline lifetime model for a component connected to a machine functional safety system, where the component is part of a system with physical devices, to monitor environmental conditions and usage conditions of the component, and to modify the baseline lifetime model based on the monitored environmental and usage conditions to produce a modified lifetime model for the component. The program code is executable by a processor to track a lifetime progress of the component with respect to the modified lifetime model and to send an alert in response to lifetime progress of the component reaching a lifetime threshold associated with the modified lifetime model.

In some embodiments, the program code is executable to use machine learning to contribute to derivation of the baseline lifetime model that is modifiable and applicable to the component of the system with physical devices. In further embodiments, the machine learning includes tracking a lifetime progress of a plurality of components similar to the component of the system with physical devices and tracking usage conditions, environmental conditions, and failures of the plurality of components to derive modifications applicable to the baseline lifetime model based on the usage conditions and applicable environmental conditions of the component of the system with physical devices.

Figure 1:
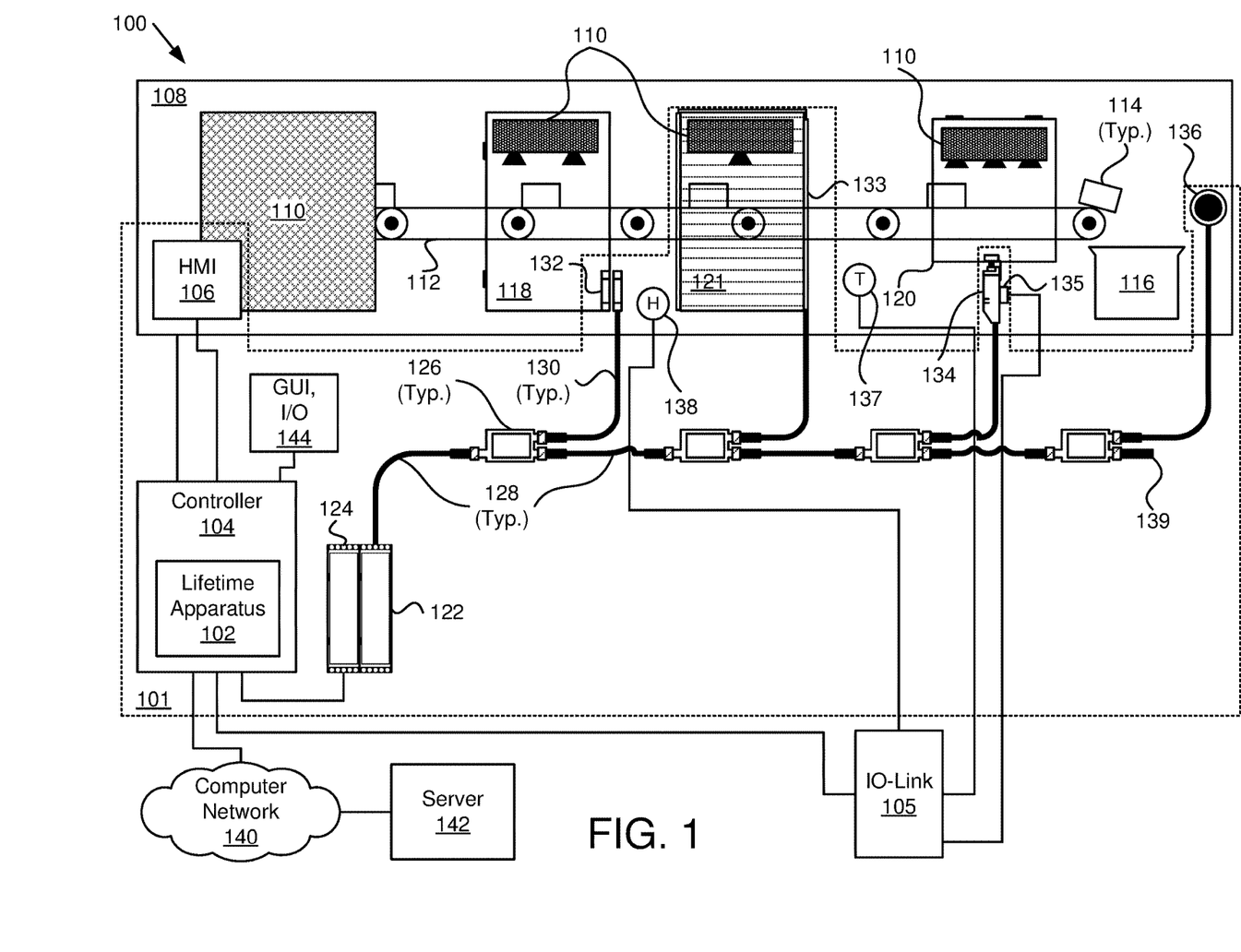
FIG. 1 is a schematic block diagram of a system with physical devices for predicting end-of-life for a component according to an embodiment.

FIG. 1 is a schematic block diagram of a system 100 for predicting end-of-life for a component according to an embodiment. The system 100 includes a lifetime apparatus 102 in a controller 104, an input/output ("IO")-link 105, a human-machine interface 106, a manufacturing line 108 with assembly/processing equipment 110, a conveyor belt 112, parts 114 being manufactured, a parts bin 116, access doors 118, 120, an opening 121, a safety relay 122, a network interface 124, connection taps 126, trunk line conductors 128, tap conductors 130, a non-contact switch 132, a light curtain 133, locking switch 134, a vibration sensor 135, an emergency stop 136, a temperature sensor 137, a humidity sensor 138, a terminator 139, a computer network 140, a server 142 and a graphical user interface and input/output devices 144, which are described below.

The lifetime apparatus 102 determines a baseline lifetime model for a component, such as a locking switch 134, of a system with physical devices, like the manufacturing line 108. The component includes one or more types of wear-out mechanisms so that predicting end-of-life for the component is useful to reduce safety issues and equipment down time. The baseline lifetime model may be modified based on environmental conditions around the component and for usage of the component. The lifetime apparatus 102 monitors conditions the environmental conditions around the component and usage of the component and modifies the baseline lifetime model to derive a modified lifetime model. For example, where elevated temperature negatively affects the component, the baseline lifetime model may be adjusted to have a reduced lifetime for the component. The lifetime apparatus 102 tracks progress of the component with respect to the modified lifetime model and sends one or more appropriate alerts in response to the component reaching one or more lifetime thresholds associated with the modified lifetime model. The lifetime apparatus 102 is described in more detail below with regard to the apparatuses 200, 300 of FIGS. 2 and 3.

The lifetime apparatus 102, in some embodiments, is in a controller 104. For example, the controller may a be Logix S000™ Controller by Rockwell Automation® or similar controller. In other embodiments, the controller 104 is a computing device capable of executing program code. The controller 104, in some embodiments includes a processor and memory coupled to the processor. In the embodiment, the lifetime apparatus 102 may be implemented with program code stored on computer readable storage media, such as a hard disk drive ("HDD"), solid-state storage ("SSD"), or other non-volatile storage where the program code may be loaded into volatile memory, such as dynamic random access memory ("DRAM") or other cache accessible to the processor for execution. In other embodiments, all or a portion of the lifetime apparatus 102 is in the safety relay 122. In other embodiments, all or a portion of the lifetime apparatus 102 is in the IO-link 104. In some embodiments, at least a portion of the lifetime apparatus 102 is in a safety device, such as a non-contact switch 132, a light curtain 133, a locking switch 134, or other safety device.

In other embodiments, the controller 104 is implemented using a programmable hardware device, such as a field programmable gate array ("FPGA"), programmable logic array, etc. for execution of the lifetime apparatus 102 In other embodiments, the controller 104 includes hardware circuits, such as custom VLSI circuits, gate arrays, etc. for implementation of the lifetime apparatus 102. The controller 104 may include a network interface card, memory, data buses, a peripheral component interconnect express ("PCIe") bus, data storage, input/output connections, and other components known to those of skill in the art. In other embodiments, the controller 104 is implemented using a combination of hardware circuits, a programmable hardware device, and/or a processor with memory. One of skill in the art will recognize other ways to implement the lifetime apparatus 102 on a controller 104.

The controller 104 and lifetime apparatus 102 are part of a machine functional safety system 101, such as a GuardLink® system by Rockwell Automation® or other machine functional safety system or industrial control system. The machine functional safety system 101 includes safety devices and other devices that are installed based on a risk assessment of conditions of a system with physical devices, such as the manufacturing line 108, to prevent injury, monitor conditions, and to minimize down time of the mechanical system. The machine functional safety system 101 may be used to prevent injury from various types of systems with physical devices, such as manufacturing equipment, electrical equipment, motors, gears, sprayers, chemical process equipment, and the like. In the embodiment of the system 100 of FIG. 1, the machine functional safety system 101 includes a safety relay 122, a network interface 124, connection taps 126, trunk line conductors 128, tap conductors 130, a non-contact switch 132, a light curtain 133, a locking switch 134, an emergency stop 136, a terminator 139, and other safety devices, sensors, actuators, switches, etc. that are part of a machine functional safety system 101.

A condition monitoring system includes an IO-link block 105 connected to environmental sensors, such as a vibration sensor 135, a temperature sensor 137, a humidity sensor 138, a pressure sensor (not shown), a chemical sensor (not shown), and/or the like, which is connected to the lifetime apparatus 102 and/or to the controller 104. In other embodiments, the environmental sensors are monitored by a system external to the condition monitoring system which may provide data to the lifetime apparatus 102 and/or controller 104. In some embodiments, one or more of the environmental sensors are part of the machine functional safety system 101. For example, the vibration sensor 135 may be connected to a connection tap 126 or may provide data to the connection tap 126 on a same tap conductor 130 as a safety device. For example, the vibration sensor 135 may be built into the safety device. In other embodiments, some components, such as the vibration sensor 135 are external to the condition monitoring system and/or machine functional safety system 101 and are able to provide data to the lifetime apparatus 102, controller 104 and/or to the condition monitoring system.

The system 100, in some embodiments, includes a human-machine interface ("HMI") 106, such a control panel, at or near the manufacturing line 108 to allow a user to control and interact with the controller 104 to control the machine functional safety system 101. The HMI 106 may include a display screen and a means to receive user input. In other embodiments, the condition monitoring system includes an HMI 106.

The manufacturing line 108 is merely representative of a system with physical devices that may be monitored by a condition monitoring system and/or machine functional safety system 101 that includes the lifetime apparatus 102. The manufacturing line 108 depicted in FIG. 1 includes assembly/processing equipment 110 and a conveyor belt 112 that interact with parts 114 being manufactured. In other embodiments, the system with physical devices may include a boiler, a gas turbine, electrical equipment, chemical processing equipment or any other system that can benefit from a condition monitoring system and/or machine functional safety system 102 depicted in the system 100 of FIG. 1.

The manufacturing line 108, as with most mechanical systems or other system with physical devices, has inherent dangers as well as equipment that may fail. The machine functional safety system 101 includes components that enable monitoring of hazardous conditions, equipment health, environmental conditions, etc. to increase safety for personnel, to predict and/or detect equipment failure and/or to predict end of life of components, such as the safety devices of the machine functional safety system 101. In some embodiments, the components of the machine functional safety system 101 help to improve performance of the manufacturing line 108 or other system with physical devices. In some embodiments, the machine functional safety system 101 includes safety devices, sensors and other components that are external to equipment within the manufacturing line 108. In other embodiments, the machine functional safety system 101 receives input from equipment within the manufacturing line 108/system with physical devices. In some embodiments, the manufacturing line 108 includes a condition monitoring system with environmental sensors that are used to monitor the safety devices of the machine functional safety system 101.

In some embodiments, the machine functional safety system 101 includes a network interface 124 connected to a safety relay 122. The network interface 124 provides a network connection to the controller 104. For example, the machine functional safety system 101 may include one internet protocol ("IP") address and may be able to provide information from safety devices through the single IP address to the controller 104. Such an arrangement beneficially reduces the number of IP addresses for a plant that includes the manufacturing line 108 or other system with physical devices. Other networking interfaces 124 may include more than one IP address, for example, for multiple safety relays 122 or multiple lines from a safety relay 122. A safety device may include a non-contact switch 132, a light curtain 133, a locking switch 134, an emergency stop 136, an actuator, a cable pull switch, a key interlock switch, and the like. In other embodiments, one or more safety devices include an IP address. In other embodiments, the safety devices run on a proprietary network different than an IP network. In other embodiments, the 10-link 105 or other device of the condition monitoring system includes an IP address and is connected over a computer network to the controller 104, lifetime apparatus 102 or other device.

In the embodiment depicted in FIG. 1, the machine functional safety system 101 includes trunk line conductors 128 running between connection taps 126. At each connection tap 126, a tap conductor 130 runs to a safety device, such as a non-contact switch 132, a light curtain 133, a locking switch 134, an emergency stop 136, a cable pull switch, etc. In other embodiments, a connection tap 126 is connected to other equipment that provides data, such as a vibration sensor 135. In other embodiments, the condition monitoring system is connected to a vibration sensor 135, an acoustic sensor (not shown), a temperature sensor 137, a humidity sensor 138, a pressure monitor (not shown), or the like. In one embodiment, the machine functional safety system 101 includes a GuardLink® system by Rockwell Automation® or similar machine functional safety system by another vendor. A safety relay 122 in a GuardLink system, in some embodiments, has capacity for two lines where each line can have up to 32 safety devices. Other machine functional safety systems 101 may include multiple safety relays 122, which would increase a capacity of the machine functional safety system 101 to include more safety devices. A GuardLink system has an ability to daisy chain between connection taps 126 without having to loop the trunk line conductor 128 in a loop while meeting applicable safety standards, such being EN/ISO 13849-1 performance level "e" ("PLe") certified by TÜVRheinland® or other applicable certification. Other machine functional safety systems 101 may include a lifetime apparatus 102 and include other features and benefits.

In the system 100 of FIG. 1, the non-contact switch 132 is on an access door 118 and may be used to monitor when the access door is open. In some embodiments, the machine functional safety system 101 may send an alert when the non-contact switch 132 senses that the access door 118 is open, which may trigger shutdown of the manufacturing line 108 or other action. In the system 100 of FIG. 1, a light curtain 133 protects an opening 121 so that if an object, such as a hand interrupts a beam of light from the light curtain 133, the machine functional safety system 101 sends an alert. In the system 100 of FIG. 1, a locking switch 134 maintains an access door closed until a signal releases the locking switch 134 and an emergency stop 136 senses a button push that triggers the machine functional safety system 101 to send an alert to shut down the manufacturing line 108 or other alert. Other machine functional safety systems 101 include other safety devices. The terminator 139 is placed on a terminal of the last connection tap 126 to signal to the machine functional safety system 101 that there are no more safety devices beyond the terminator 139.

The vibration sensor 135 is positioned to monitor vibrations on the locking switch 134 and transmits vibration data to the controller 104 through an IO-link 105. In other embodiments, the vibration sensor 135 transmits data over a same tap conductor 130 and connection tap 126 as the locking switch 134 and may be built into the locking switch 134. In other embodiments, the vibration sensor 135 transmits vibration data over a system different than the machine functional safety system 101 and the vibration data is accessible to the lifetime apparatus 102. In other embodiments, one or more other sensors, such as an acoustic sensor, monitor conditions at the locking switch 134. In other embodiments, other components or safety devices, such as the non-contact switch 134, the light curtain 133, etc. have a vibration sensor 135 or other sensor.

In some embodiments, a system different than the condition monitoring system monitors various conditions that would alter a lifetime of a component. For example, a building monitoring system may monitor temperature, humidity, pressure, vibrations, acoustic noise, etc. and may provide input to the lifetime apparatus 102. In some embodiments, the temperature sensor 137, humidity sensor 138, chemical sensor, etc. are located in a space where the component being monitored is located. In other embodiments, the, the temperature sensor 137, humidity sensor 138, chemical sensor, etc. are located adjacent to the component being monitored.

In the system 100 of FIG. 1, the condition monitoring system includes an IO-link that is connected to environmental sensors and transmits data to the lifetime apparatus 102. In some embodiments, each environmental sensor is connected to a different IO-link 105. In other embodiments, the IO-link 105 is connected to the lifetime apparatus 102 over a network and in some embodiments the IO-link 105 includes an IP address. In some embodiments, the IO-link 105 includes some or all of the lifetime apparatus 102 and transmits data to the controller 104, such as an alert or other lifetime data associated with a component.

In the system 100 of FIG. 1, the controller 104 is connected to a server 142 over a computer network 140. The controller 104 may communicate with the server 142 for various purposes. For example, the server 142 may control at least some aspects of a system with physical devices, such as the manufacturing line 108. For example, the server 142 may be in contact with one or more motor controllers of the manufacturing line 108 and may control starting and stopping of the manufacturing line 108. In other embodiments, the controller 104 controls the manufacturing line 108 and the server 142 may allow remote access. One of skill in the art will recognize other purposes for the server 142 and configurations to communicate with and control the manufacturing line 108.

In some embodiments, some or all of the lifetime apparatus 102 is located in a server 142, a cloud computing system, or similar computing device removed from the controller 104, machine functional safety system 101 and system with physical devices and communicates with the controller 104, machine functional safety system 101 and/or system with physical devices to gather information useful in deriving a baseline lifetime model of a component or similar components, to monitor usage and environmental conditions, to modify the baseline lifetime model, to track progress of a component on a modified lifetime model and/or to send alerts.

In some embodiments, the controller 104 is connected to or includes a graphical user interface ("GUI") and input/output devices 144 that allow a user to interact with the lifetime apparatus 102 of the controller 104 to enter and view information. For example, the GUI and input/output devices 144 may be an electronic display, keyboard, mouse, etc. In other embodiments, a user may interact with the lifetime apparatus 102 via the HMI 106 and/or the server 142. In some examples, in conjunction with setup of a component, such as a safety device in the machine functional safety system 101, the controller 104 displays a lifetime model user interface to provide information about the component, the location of the component, sensors associated with the component, and the like. The lifetime model user interface facilitates entry of the parameters relevant to building a baseline lifetime model for the component being monitored. For example, when the component is first added to a system, such as the machine functional safety system 101, the user interface may prompt a user involved in installing the component to enter data regarding the component, environment of the component, identification of sensors, such as a vibration sensor 135, monitoring conditions associated with the component being monitored, and the like. In other embodiments, the user interface allows updating or adding component information after setup of the component.

Typically, the machine functional safety system 101 is designed using a risk assessment, which may include a projected useful lifetime of various components. The risk assessment may include a risk assessment for various parts of a manufacturing line 108 or other mechanical system with physical devices. For example, a portion of the risk assessment may be directed to the opening 121 that allows access to processing equipment 110. The risk assessment may take into account information such as distance from the opening 121 to the processing equipment 110, a hazard level for the processing equipment 110 accessible via the opening 121, an amount of time required to stop the processing equipment 110 or whole manufacturing line 108, delay from the time that the light curtain 133 is triggered until an alert is sent to controls of the manufacturing line 108, etc. Spacing of beams of light of the light curtain 133 may be categorized as finger penetration, hand penetration, body penetration, etc. For example, one light curtain may be triggered when a finger penetrates the light curtain while another light curtain may be triggered when a hand penetrates the light curtain. The risk assessment takes into account the type of light curtain 133 installed. The risk assessment may require beam spacing for hand penetration where there is sufficient time to stop the hazardous equipment accessible through the opening 121 when a hand reaches through the opening 121.

An important part of risk, especially for critical equipment, is a prediction of how long a particular component may last before failing. A useful lifetime of a component may initially include particular operating conditions, a rate of use of the component, and the like. In some instances, a baseline lifetime model may be derived in ideal conditions or basic laboratory conditions and may not take into account extremes in temperature, humidity, voltage, current, vibration, etc.

Figure 6:
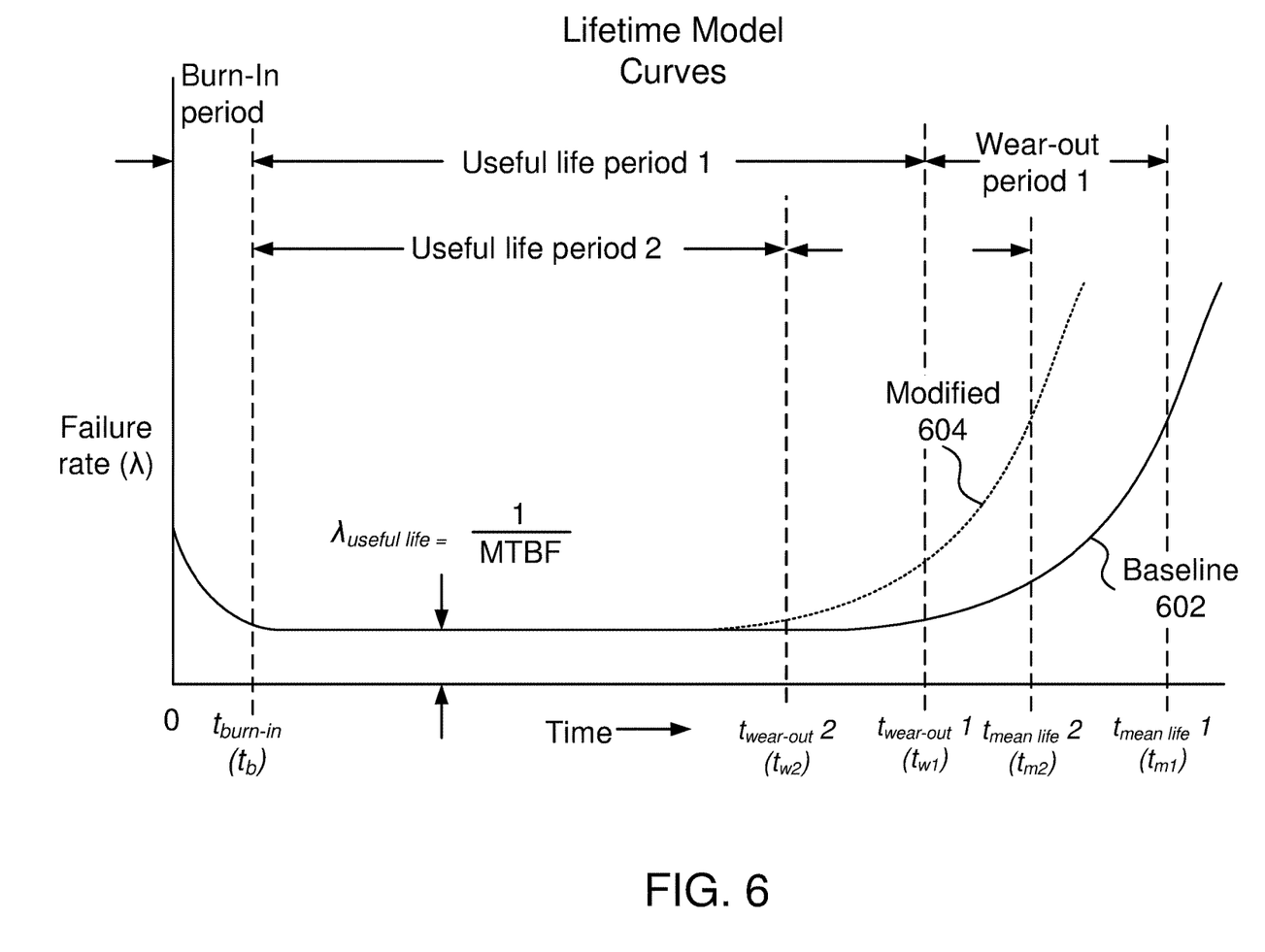
FIG. 6 is a diagram illustrating a baseline curve for baseline lifetime model and a modified curve for a modified lifetime model for a component.

FIG. 6 is a diagram illustrating a baseline curve 602 for baseline lifetime model and a modified curve 604 for a modified lifetime model for a component. The baseline curve 602 and modified curve 604 are typical "bathtub" curves where during a burn-in period where there is initially an elevated failure rate $\lambda$, a useful life period where the failure rate $\lambda$ is the useful life failure rate $\lambda_{useful\ life}$, which is the reciprocal of mean time before failure ("MTBF"), and a wear-out period where the failure rate $\lambda$ increases typically exponentially. Where conditions are adverse for the component, the baseline curve 602 may change to have a shorter useful life period, as indicated by the modified curve 604. For example, a lower voltage for a switch may cause increased debris build-up and quicker failure of the switch, which then results in a lower useful life period (e.g. useful life period 2). Other factors that may reduce the useful life period of a component may include temperature, humidity, pressure, voltage, current, higher than expected usage, certain chemicals in the air, etc. The modified curve 604 may be the result of one environmental or usage condition or may be a result of two or more environmental or usage conditions.

Figure 2:
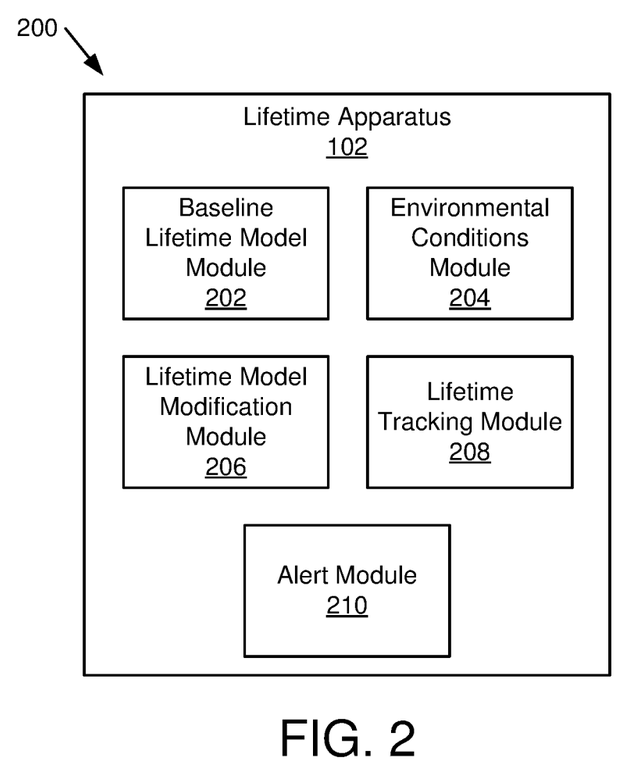
FIG. 2 is a schematic block diagram of an apparatus for predicting end-of-life for a component according to an embodiment.

FIG. 2 is a schematic block diagram of an apparatus 200 for predicting end-of-life for a component according to an embodiment. The apparatus 200 includes one embodiment of the lifetime apparatus 102 with a baseline lifetime model module 202, an environmental conditions module 204, a lifetime model modification module 206, a lifetime tracking module 208 and an alert module 210, which are described in more detail below. The lifetime apparatus 102 may be implemented, in one embodiment, as program code stored on computer readable storage media executable by a processor. In other embodiments, the lifetime apparatus 102 may be implemented by a programmable hardware device. In other embodiments, the lifetime apparatus 102 is at least in part implemented using hardware circuits. In other embodiments, the lifetime apparatus 102 is implemented using a combination of program code, a programmable hardware device and/or hardware circuits.

The apparatus 200 includes a baseline lifetime model module 202 configured to determine a baseline lifetime model for a component connected to a machine functional safety system 101. The component is part of a system with physical devices, such as the manufacturing line 108. In some embodiments, the component is a safety device. The baseline lifetime model, in some embodiments, is a lifetime model provided by a manufacturer of the component or is derived from information from the manufacturer. In other embodiments, the baseline lifetime model is adjusted for expected operating conditions of the component. For example, the baseline lifetime model may be based on a particular expected temperature range.

In some embodiments, the baseline lifetime model includes equations that include input variables of one or more environmental conditions and usage conditions. For example, the baseline lifetime model may include one or more equations that produce the baseline curve 602 of FIG. 6 and may include inputs of one or more of temperature, humidity, pressure, number of operational cycles, voltage, current, etc. that change the baseline curve 602 to a modified curve 604. The baseline lifetime model may adjust slopes, failure probability during useful life, thresholds such as the wear-out time $t_w$, and the like.

The apparatus 200 includes an environmental conditions module 204 configured to monitor environmental conditions and usage conditions of the component. For example, the environmental conditions module 204 uses data from the temperature sensor 137, the humidity sensor 138, the vibration sensor 135, and/or other sensors. In some embodiments, the component is capable of being monitored and controlled. In some examples, the component is monitored to gather usage data, such as number of times the component is operated, voltage at or within the component, current through the component, and the like. In some embodiments, the condition monitoring system monitors usage conditions of the component. In some embodiments, the environmental conditions module 204 gathers data from a system different than the condition monitoring system.

The apparatus 200 includes a lifetime model modification module 206 configured to modify the baseline lifetime model based on the monitored environmental and usage conditions to produce a modified lifetime model for the component. For example, the lifetime model modification module 206 uses environmental and/or usage data gathered by the environmental conditions module 204 and inputs the data into one or more equations of the baseline lifetime model to derive the modified lifetime model of the component being monitored, which may result in a modified curve 604 as depicted in FIG. 6.

In some embodiments, the lifetime model modification module 206 uses a cumulative average of usage and/or environmental conditions. In another embodiment, the lifetime model modification module 206 uses a cumulative total of one or more usage and/or environmental conditions. For example, the lifetime model modification module 206 may use a cumulative total of operational cycles of the component. In some embodiments, the lifetime model modification module 206 includes weighting factors for one or more usage and environmental conditions. For example, the lifetime model modification module 206 may weight extreme temperatures beyond a threshold temperature more than less extreme temperatures. One of skill in the art will recognize other ways that the lifetime model modification module 206 uses monitored environmental and/or usage conditions to modify the baseline lifetime model to derive the modified lifetime model.

The apparatus 200 includes a lifetime tracking module 208 configured to track a lifetime progress of the component with respect to the modified lifetime model. In one example, the lifetime tracking module 208 tracks usage time of the component. In some embodiments, the lifetime tracking module 208 tracks only time where the component is being used, is active, is operational, or the like. In other embodiments, the lifetime tracking module 208 tracks a total time after the component is installed in a system with physical devices, such as the manufacturing line 108.

In some embodiments, the lifetime model modification module 206 continually or periodically updates the baseline lifetime model while the lifetime tracking module 208 tracks the lifetime progress of the component on a most recent modified lifetime model. In another embodiment, the lifetime tracking module 208 tracks operational cycles of the component to derive lifetime progress of the component. For example, the curves 602, 604 in FIG. 6 may have an x-axis of operational cycles instead of time. One of skill in the art will recognize other ways for the lifetime tracking module 208 to track a lifetime progress of the component with respect to the modified model.

The apparatus 200 includes an alert module 210 configure to send an alert in response to lifetime progress of the component reaching a lifetime threshold associated with the modified lifetime model. In one example, the lifetime threshold is the wear-out time 2 $t_{w2}$ of the modified lifetime model. In other embodiments, the alert module 210 predicts a wear-out time $t_w$ and sets the lifetime threshold a certain amount of time before the wear-out time $t_w$. In some embodiments, the lifetime threshold is set to allow time for the component to be replaced, which may include simple installation time or may include ordering time, shipping time and installation time. In other embodiments, the alert module 210 sends multiple alerts based on multiple lifetime thresholds. For example, the alert module 210 may send an alert in advance of the wear-out time $t_w$ and may send another alert at the wear-out time $t_w$ and possibly another alert at a higher probably of failure. The alert may be sent to a plant manager, a system administrator or other person capable of acting on the alert. One of skill in the art will recognize other ways for the alert module 210 to send an alert and other applicable lifetime thresholds.

Figure 3:
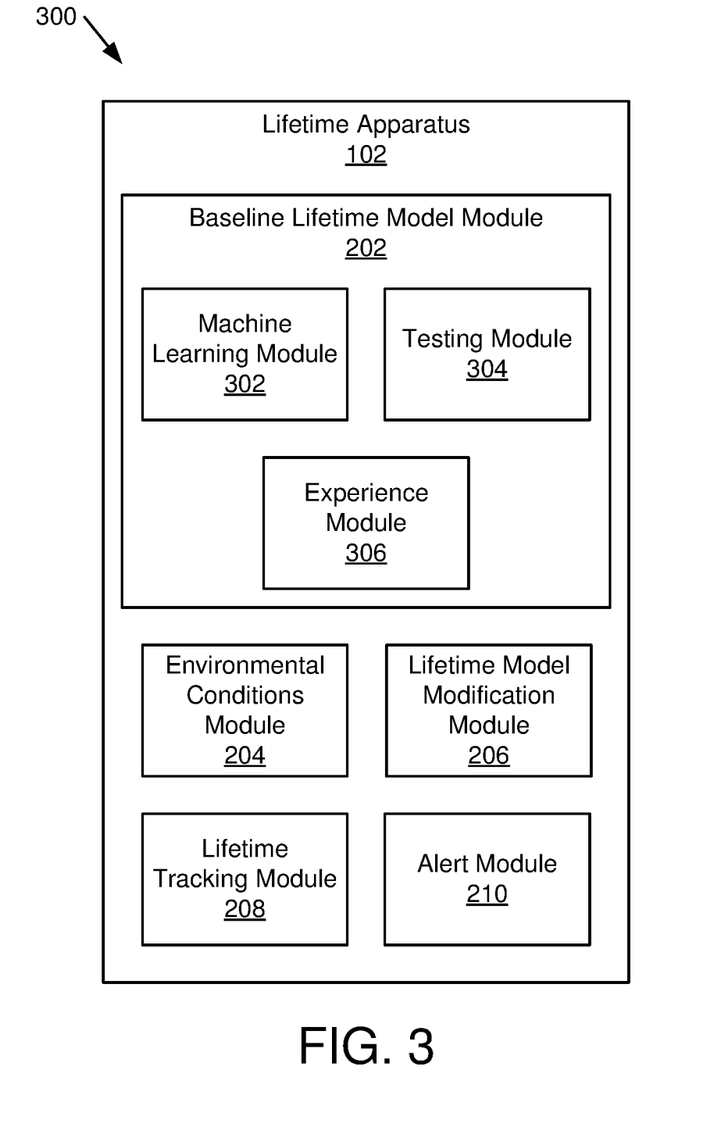
FIG. 3 is a schematic block diagram of another apparatus for predicting end-of-life for a component according to an embodiment.

FIG. 3 is a schematic block diagram of another apparatus 300 for predicting end-of-life for a component according to an embodiment. The apparatus 300 includes another embodiment of the lifetime apparatus 102 with a baseline lifetime model module 202, an environmental conditions module 204, a lifetime model modification module 206, a lifetime tracking module 208 and an alert module 210, which are substantially similar to those described above in relation to the apparatus 200 of FIG. 2. The lifetime apparatus 102 includes a baseline lifetime model module 202 that includes a machine learning module 302, a testing module 304 and/or an experience module 306, which are described below. In other embodiments, one or more of the machine learning module 302, the testing module 304 and/or the experience module 306 are located external to the baseline lifetime model module 202 and are accessible by the baseline lifetime model module 202 to determine a baseline lifetime model for the component of the system with physical devices. The apparatus 300, in some embodiments, is implemented in a similar way as the apparatus 200 of FIG. 2.

The apparatus 300, in some embodiments, includes a machine learning module 302 configured to use machine learning to contribute to derivation of the baseline lifetime model that is modifiable and applicable to the component of the system 100. In some embodiments, the machine learning includes tracking a lifetime progress of a plurality of components similar to the component of the system 100 and tracking usage conditions, environmental conditions, and failures of the plurality of components to derive modifications applicable to the baseline lifetime model based on the usage conditions and applicable environmental conditions of the component of the system 100. In one example, the machine learning module 302 accesses data from multiple systems with a component similar to the component being monitored by lifetime apparatus 102 of the system 100. In some example, the machine learning module 302 accesses a deep neural network with inputs from various similar components and associated environmental and usage conditions and failure data of the components. The machine learning module 302, in other examples, accesses data collected for components similar to the component being monitored by the lifetime apparatus 102.

In some embodiments, the components similar to the component being monitored have a same model number, are of a same component family or are otherwise similar enough to have a same or similar lifetime characteristics that are affected in similar ways by environmental and usage conditions. The machine learning module 302 tracks failure data of the plurality of components to be able to determine how various conditions affect lifetime of the plurality of components. In some embodiments, the machine learning module 302 adjusts parameters, weighting factors, etc. of the baseline lifetime model so that over time the baseline lifetime model is more accurate. In other embodiments, adjusting parameters, weighting factors, etc. of the baseline lifetime model the machine learning module 302 refines how the baseline lifetime model is affected by various conditions.

In some embodiments, the machine learning module 302 contributes to the baseline lifetime model at the beginning of life of a component when the component is installed. In other embodiments, the machine learning module 302 works in conjunction with the lifetime model modification module 206 to affect modified lifetime models. One of skill in the art will recognize other implementations of the machine learning module 302 to contribute to the derivation of the baseline lifetime model and/or the modified lifetime model of a component.

The apparatus 300, in some embodiments, includes a testing module 304 configured to contribute to derivation of the baseline lifetime model that is modifiable and applicable to the component of the system with physical devices by testing a plurality of components similar to the component of the system with physical devices under various usage and environmental conditions and tracking failures of the plurality of components. In some embodiments, the testing module 304 controls testing equipment used to test a plurality of components similar to the component of the system with physical devices and adjusts both environmental conditions and usage conditions of the components and determines when each component fails and then uses data from the testing to modify the baseline lifetime model. In other embodiments, the testing module 304 accesses test results for a plurality of components similar to the component of the system with physical devices where the test results are for various environmental and usage conditions and include failure data, and uses the test results for modifying the baseline lifetime model and/or a modified lifetime model of the component of the system with physical devices. One of skill in the art will recognize other ways that the testing module 304 can use test results for various environmental and usage conditions and failure data to modify a baseline lifetime model for the component of the system with physical devices.

The apparatus 300 includes, in some embodiments, an experience module 306 configured to contribute to derivation of the baseline lifetime model that is modifiable and applicable to the component of the system with physical devices by gathering information from customers reporting component failures of components similar to the component of the system with physical devices and gathering usage information and environmental information where the components were installed. For example, the experience module 306 may include a graphical user interface ("GUI") for a customer or other person to input failure data and associated environmental and/or usage conditions of the components. In other embodiments, the experience module 306 accesses one or more databases of customers where component failure data and associated environmental and/or usage conditions of the similar components are stored. The experience module 306 uses the customer data to modify the baseline lifetime model and/or a modified lifetime model of the component of the system with physical devices.

Figure 4:
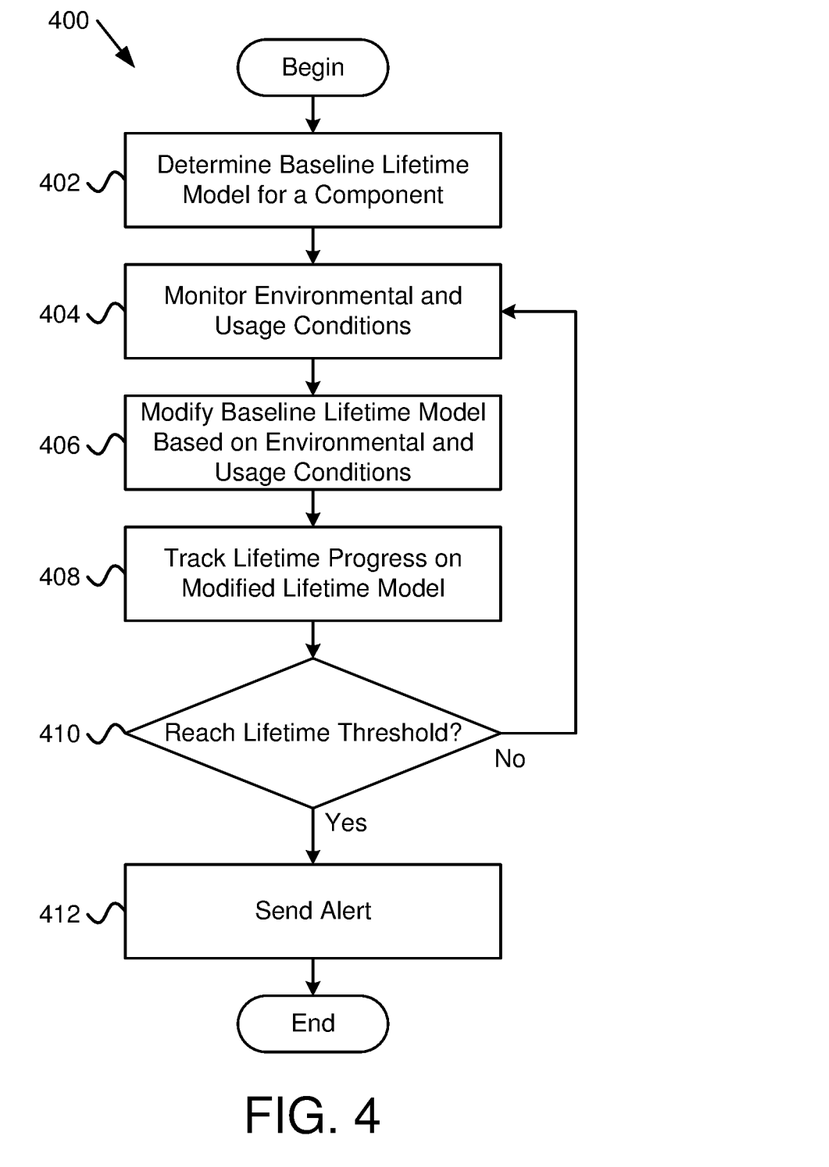
FIG. 4 is a flowchart diagram of a method for predicting end-of-life for a component according to an embodiment.

FIG. 4 is a flowchart diagram of a method 400 for predicting end-of-life for a component according to an embodiment. The method 400 begins and determines 402 a baseline lifetime model for a component connected to a machine functional safety system 101. The component is part of a system with physical devices, such as the manufacturing line 108. The method 400 monitors 404 environmental conditions and usage conditions of the component and modifies 406 the baseline lifetime model based on the monitored environmental and usage conditions to produce a modified lifetime model for the component. The method 400 tracks 408 a lifetime progress of the component with respect to the modified lifetime model.

The method 400 determines 410 if a lifetime progress of the component reaches a lifetime threshold associated with the modified lifetime model. If the method 400 determines 410 that the lifetime progress of the component reaches a lifetime threshold associated with the modified lifetime model, the method 400 sends 412 and alert and the method 400 ends. If the method 400 determines 410 that the lifetime progress of the component has not reached a lifetime threshold associated with the modified lifetime model, the method 400 returns and monitors 404 environmental conditions and usage conditions of the component. In various embodiments, the method 400 is implemented with one or more of the baseline lifetime model module 202, the environmental conditions module 204, the lifetime model modification module 206, the lifetime tracking module 208 and the alert module 210.

Figure 5:
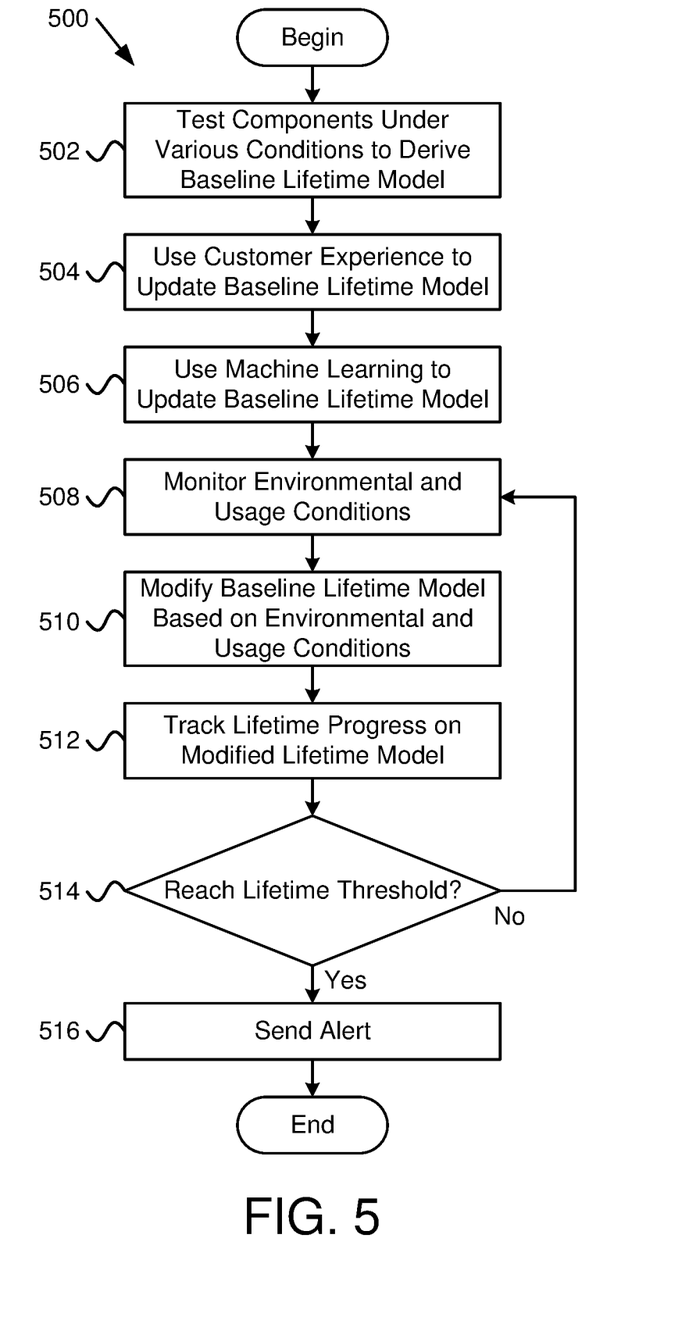
FIG. 5 is a flowchart diagram of another method for predicting end-of-life for a component according to an embodiment.

FIG. 5 is a flowchart diagram of another method 500 for predicting end-of-life for a component according to an embodiment. The method 500 begins and, in some embodiments, tests 502 a plurality of components similar to a component of a system with physical devices under various usage and environmental conditions and tracks failures of the plurality of components to contribute to derivation of a baseline lifetime model for the component. The method 500, in some embodiments, uses 504 information gathered from customers reporting component failures of components similar to the component of the system with physical devices and gathers usage information and environmental information where the components were installed to contribute to derivation of the baseline lifetime model for the component.

The method 500, in some embodiments, uses 506 machine learning to contribute to derivation of the baseline lifetime model that is modifiable and applicable to the component of the system with physical devices. In some embodiments, the machine learning tracks a lifetime progress of a plurality of components similar to the component of the system with physical devices and tracks usage conditions, environmental conditions, and failures of the plurality of components to derive modifications applicable to the baseline lifetime model based on the usage conditions and applicable environmental conditions of the component of the system with physical devices.

The method 500 monitors 508 environmental conditions and usage conditions of the component and modifies 510 the baseline lifetime model based on the monitored environmental and usage conditions to produce a modified lifetime model for the component. The method 500 tracks 512 a lifetime progress of the component with respect to the modified lifetime model and determines 514 if a lifetime progress of the component reaches a lifetime threshold associated with the modified lifetime model. If the method 500 determines 514 that the lifetime progress of the component reaches a lifetime threshold associated with the modified lifetime model, the method 500 sends 516 and alert and the method 500 ends. If the method 500 determines 514 that the lifetime progress of the component has not reached a lifetime threshold associated with the modified lifetime model, the method 500 returns and monitors 508 environmental conditions and usage conditions of the component. In various embodiments, the method 500 is implemented with one or more of the baseline lifetime model module 202, the environmental conditions module 204, the lifetime model modification module 206, the lifetime tracking module 208, the alert module 210, the machine learning module 302, the testing module 304 and/or the experience module 306.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art.

Such other examples are intended to be within the scope of the claims if they have structural elements that do not differ from the literal language of the claims, or if they include equivalent structural elements with insubstantial differences from the literal language of the claims.

What is claimed is:

1. A method comprising:
    determining a baseline lifetime model for a component connected to a machine functional safety system from an equation-based lifetime model, the component part of a system with physical devices, the baseline lifetime model generated from the equation-based lifetime model using initial environmental conditions and usage conditions;
    monitoring environmental conditions and usage conditions of the component during usage of the component;
    modifying the baseline lifetime model based on the monitored environmental and usage conditions of the component to produce a modified lifetime model for the component by inputting the monitored environmental and usage conditions of the component into one or more equations of the equation-based lifetime model to derive the modified lifetime model of the component being monitored;
    tracking a lifetime progress of the component with respect to the modified lifetime model; and
    sending an alert in response to lifetime progress of the component reaching a lifetime threshold associated with the modified lifetime model.

2. The method of claim 1, wherein further comprising using machine learning to contribute to derivation of the baseline lifetime model that is modifiable and applicable to the component of the system with physical devices.

3. The method of claim 2, wherein the machine learning comprises tracking a lifetime progress of a plurality of components similar to the component of the system with physical devices and tracking usage conditions, environmental conditions, and failures of the plurality of components to derive modifications applicable to the baseline lifetime model based on the usage conditions and applicable environmental conditions of the component of the system with physical devices.

4. The method of claim 1, further comprising contributing to derivation of the baseline lifetime model that is modifiable and applicable to the component of the system with physical devices by testing a plurality of components similar to the component of the system with physical devices under various usage and environmental conditions and tracking failures of the plurality of components.

5. The method of claim 1, further comprising contributing to derivation of the baseline lifetime model that is modifiable and applicable to the component of the system with physical devices by gathering information from customers reporting component failures of components similar to the component of the system with physical devices and gathering usage information and environmental information where the components were installed.

6. The method of claim 1, wherein the component of the system with physical devices is a safety device connected to the machine functional safety system.

7. The method of claim 1, wherein the usage conditions comprise operating cycles, current, voltage and/or power usage of the component.

8. The method of claim 1, wherein the environmental conditions comprise vibration, temperature, humidity and/or chemicals present where the component is installed.

9. The method of claim 1, wherein the lifetime threshold comprises a point in the modified lifetime model indicative of the component approaching a rapid increase in probability of failure of the component.

10. The method of claim 1, wherein the component comprises an interlock switch, a non-contact switch, a limit switch, a light curtain, a cable pull switch and/or a mechanical switch.

11. An apparatus comprising:
    a processor; and
    a memory that stores program code executable by the processor to:
    determine a baseline lifetime model for a component connected to a machine functional safety system from an equation-based lifetime model, the component part of a system with physical devices, the baseline lifetime model generated from the equation-based lifetime model using initial environmental conditions and usage conditions;
    monitor environmental conditions and usage conditions of the component during usage of the component;
    modify the baseline lifetime model based on the monitored environmental and usage conditions of the component to produce a modified lifetime model for the component by inputting the monitored environmental and usage conditions of the component into one or more equations of the equation-based lifetime model to derive the modified lifetime model of the component being monitored;
    track a lifetime progress of the component with respect to the modified lifetime model; and
    send an alert in response to lifetime progress of the component reaching a lifetime threshold associated with the modified lifetime model.

12. The apparatus of claim 11, further comprising program code executable by the processor to use machine learning to contribute to derivation of the baseline lifetime model that is modifiable and applicable to the component of the system with physical devices, wherein the machine learning comprises tracking a lifetime progress of a plurality of components similar to the component of the system with physical devices and tracking usage conditions, environmental conditions, and failures of the plurality of components to derive modifications applicable to the baseline lifetime model based on the usage conditions and applicable environmental conditions of the component of the system with physical devices.

13. The apparatus of claim 11, further comprising program code executable by the processor to contribute to derivation of the baseline lifetime model that is modifiable and applicable to the component of the system with physical devices by testing a plurality of components similar to the component of the system with physical devices under various usage and environmental conditions and tracking failures of the plurality of components.

14. The apparatus of claim 11, further comprising program code executable by the processor to contribute to derivation of the baseline lifetime model that is modifiable and applicable to the component of the system with physical devices by gathering information from customers reporting component failures of components similar to the component of the system with physical devices and gathering usage information and environmental information where the components were installed.

15. The apparatus of claim 11, wherein the usage conditions comprise operating cycles, current, voltage and/or power usage of the component.

16. The apparatus of claim 11, wherein the environmental conditions comprise vibration, temperature, humidity and/or chemicals present where the component is installed.

17. The apparatus of claim 11, wherein the lifetime threshold comprises a point in the modified lifetime model indicative of the component approaching a rapid increase in probability of failure of the component.

18. The apparatus of claim 11, wherein the component comprises an interlock switch, a non-contact switch, a limit switch, a light curtain, a cable pull switch and/or a mechanical switch.

19. A computer program product comprising a computer readable storage medium having program code embodied therein, the program code executable by a processor to:
 determine a baseline lifetime model for a component connected to a machine functional safety system from an equation-based lifetime model, the component part of a system with physical devices, the baseline lifetime model generated from the equation-based lifetime model using initial environmental conditions and usage conditions;
 monitor environmental conditions and usage conditions of the component during usage of the component;
 modify the baseline lifetime model based on the monitored environmental and usage conditions of the component to produce a modified lifetime model for the component by inputting the monitored environmental and usage conditions of the component into one or more equations of the equation-based lifetime model to derive the modified lifetime model of the component being monitored;
 track a lifetime progress of the component with respect to the modified lifetime model; and
 send an alert in response to lifetime progress of the component reaching a lifetime threshold associated with the modified lifetime model.

20. The computer program product of claim 19, the program code further configured to use machine learning to contribute to derivation of the baseline lifetime model that is modifiable and applicable to the component of the system with physical devices, wherein the machine learning comprises tracking a lifetime progress of a plurality of components similar to the component of the system with physical devices and tracking usage conditions, environmental conditions, and failures of the plurality of components to derive modifications applicable to the baseline lifetime model based on the usage conditions and applicable environmental conditions of the component of the system with physical devices.

\* \* \* \* \*